United States Patent
Bower et al.

(10) Patent No.: US 9,329,386 B2
(45) Date of Patent: May 3, 2016

(54) APPARATUS AND ASSOCIATED METHODS

(71) Applicant: Nokia Corporation, Espoo (FI)

(72) Inventors: Chris Bower, Cambridgeshire (GB); Mark Allen, Cambridge (GB); Paul Beecher, Cambridge (GB); Ilkka Niemela, Nokia (FI); Zoran Radivojevic, Cambridgeshire (GB); Piers Andrew, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 326 days.

(21) Appl. No.: 13/903,296

(22) Filed: May 28, 2013

(65) Prior Publication Data

US 2014/0355117 A1   Dec. 4, 2014

(51) Int. Cl.
  *B60R 1/06*  (2006.01)
  *G02B 27/00*  (2006.01)

(52) U.S. Cl.
  CPC .................................. *G02B 27/0006* (2013.01)

(58) Field of Classification Search
  CPC ...... G02B 27/0006; G02B 23/16; G02B 7/00; G02B 27/00; G03B 17/08; G02F 2001/133331
  USPC ......... 359/507, 509, 511, 512, 513, 514, 894, 359/896, 900
  See application file for complete search history.

(56) References Cited

U.S. PATENT DOCUMENTS

| | | | | |
|---|---|---|---|---|
| 7,789,949 B2* | 9/2010 | Sparks | .................... | F04B 37/04 252/181.2 |
| 2002/0114934 A1* | 8/2002 | Liu | ........................... | C08F 2/44 428/212 |
| 2007/0268587 A1* | 11/2007 | Ninomiya | .............. | G02B 1/105 359/601 |
| 2011/0255141 A1* | 10/2011 | Agrawal | ................. | B60R 1/088 359/267 |
| 2012/0126098 A1* | 5/2012 | Bartenbach | ............. | F21V 11/04 250/214 AL |
| 2012/0313508 A1 | 12/2012 | Son et al. | ....................... | 313/504 |

OTHER PUBLICATIONS

"Organic Electronics—Is the Future of Electronics Organic?", MIT Stanford UC Berkeley Nanotechnology Forum, Apr. 22, 2005, 2 pgs.

* cited by examiner

*Primary Examiner* — Stephone B Allen
*Assistant Examiner* — Rahman Abdur
(74) *Attorney, Agent, or Firm* — Harrington & Smith

(57) ABSTRACT

A display protector for use with a heat source, the display protector including one or more transparent fluid incident regions and one or more fluid driver regions, wherein the display protector is configured to guide a fluid incident upon one or more of the transparent fluid incident regions away to one or more of the fluid driver regions to facilitate driving of the fluid from the one or more fluid driver regions by heat supplied by the heat source.

18 Claims, 7 Drawing Sheets

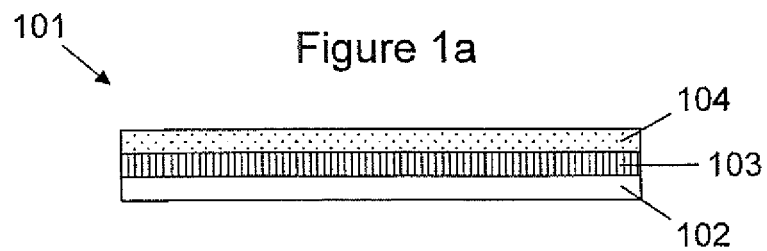
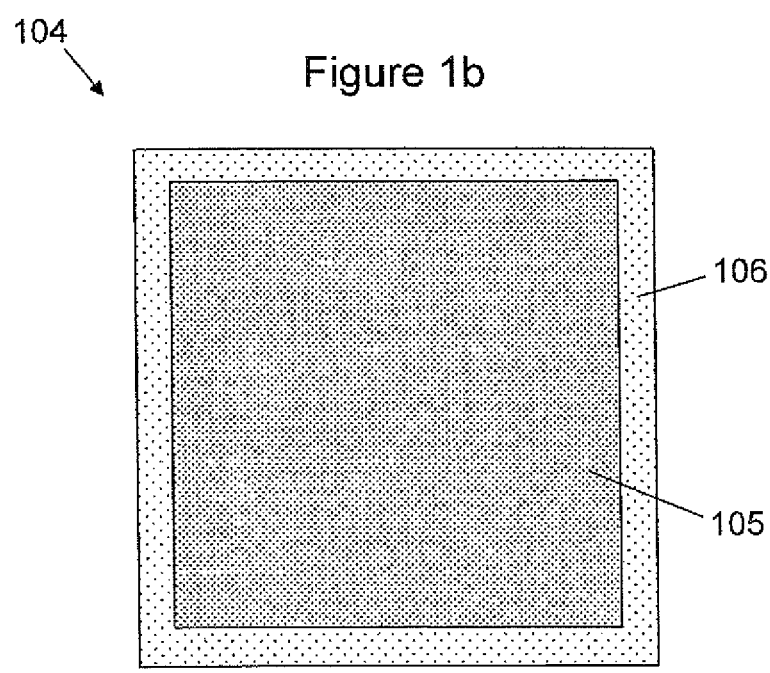

APPARATUS AND ASSOCIATED METHODS

TECHNICAL FIELD

The present disclosure relates to the field of display protectors, associated methods and apparatus, and in particular concerns a display protector configured to guide a fluid incident upon one or more fluid incident regions of the display protector away to one or more fluid driver regions of the display protector to facilitate driving of the fluid from the one or more fluid driver regions by heat supplied by a heat source. Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs) and tablet PCs.

The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Electronic displays are an important part of many modern electronic devices. Such displays, however, are vulnerable to damage by the ingress of fluid from the surrounding environment. Although display protectors have been developed to address this problem, existing display protectors may be insufficient for use with organic light-emitting diode (OLED) displays which are particularly vulnerable to damage by water and oxygen.

The apparatus and methods disclosed herein may or may not address this issue.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided a display protector for use with a heat source, the display protector comprising one or more transparent fluid incident regions and one or more fluid driver regions, wherein the display protector is configured to guide a fluid incident upon one or more of the transparent fluid incident regions away to one or more of the fluid driver regions to facilitate driving of the fluid from the one or more fluid driver regions by heat supplied by the heat source.

The display protector may be configured to guide the incident fluid laterally and/or vertically with respect to the plane of the display protector. The fluid may be driven laterally and/or vertically from the one or more fluid driver regions by the heat supplied by the heat source.

The display protector may comprise one or more layers with a plurality of particles embedded therein. The relative distribution of the particles within the respective fluid incident regions and fluid driver regions of the one or more layers may be configured to guide the fluid incident upon the fluid incident regions away to the fluid driver regions.

The relative distribution may be such that the average size of the particles within the fluid driver regions is smaller than the average size of the particles within the fluid incident regions. The relative distribution may be such that the size of the particles within the fluid incident regions increases with increasing distance from the fluid driver regions. The relative distribution may be such that the concentration of the particles (i.e. the number of particles in a given area or volume) within the fluid driver regions is greater than the concentration of the particles within the fluid incident regions. The relative distribution may be such that the concentration of the particles within the fluid incident regions decreases with increasing distance from the fluid driver regions.

The particles may have a diameter of no more than 1 µm and/or no more than 100 nm. The particles may comprise a getter material. At least one of the one or more layers may comprise an adhesive. The particles may be distributed within the adhesive to provide the display protector. The layer of adhesive may be substantially optically transparent and/or substantially mechanically resilient.

The display protector may comprise one or more patterned fluid channels configured to guide the fluid incident upon the fluid incident regions away to the fluid driver regions. The patterned fluid channels may lead from the fluid incident regions to the fluid driver regions. The width of the patterned fluid channels may decrease towards the fluid driver regions. Some of the fluid channels in the fluid incident regions may be configured to merge into one or more wider fluid channels leading from the fluid incident regions to the fluid driver regions. The fluid channels may be arranged in a fractal-like pattern.

The patterned fluid channels may be formed from a layer of getter material. The display protector may comprise a layer of adhesive configured for attaching the layer of getter material to one or more layers of an electronic display. One or both of the layer of getter material and the layer of adhesive may be substantially optically transparent and/or substantially mechanically resilient. The layer of adhesive may have a thickness of between 1 µm and 100 µm.

The display protector may comprise at least one fluidphobic or fluidphilic material to guide the fluid incident upon the fluid incident regions away to the fluid driver region. The fluid incident regions may comprise a fluidphobic material and/or the fluid driver regions may comprise a fluidphilic material.

The display protector may comprise a porous substrate having a pore structure configured to guide the fluid incident upon the fluid incident regions away to the fluid driver regions. The pore structure may comprise one or more pores leading from the fluid incident regions to the fluid driver regions. The diameter of the pores may decrease towards the fluid driver regions.

The pore structure may comprise one or more pores having a diameter of no more than 1 µm and/or no more than 100 nm. The display protector may comprise a getter material within the pores of the porous substrate. One or both of the porous substrate and the getter material may be substantially optically transparent and/or substantially mechanically resilient. The porous substrate may comprise a block copolymer. The block copolymer may have a horizontally-oriented lamellar structure. The block copolymer may be an adhesive.

It should be noted that two or more of the techniques described herein for guiding the fluid from the fluid incident regions to the fluid driver regions may be combined.

The fluid may comprise a liquid, gas and/or vapour. The fluid may comprise water and/or oxygen.

According to a further aspect, there is provided an apparatus comprising any display protector described herein and the heat source. The heat source may be located in proximity to the display protector. The apparatus may comprise a fluid-sensitive sensor configured to control the amount of heat supplied by the heat source based on the amount of incident fluid. The heat source may comprise a resistive heating element. The fluid-sensitive sensor may comprise a fluid-sensitive resistor serially connected to the resistive heating element. The fluid-sensitive resistor may be configured such that its electrical resistance decreases as the amount of fluid increases. The apparatus may comprise a touch sensitive display. The heat source may comprise a drive or sense line of the touch sensitive display.

The apparatus may be one or more of an electronic device, a portable electronic device, a telecommunications device, a portable telecommunications device, an electronic display, a touch-sensitive display, and a module for any of the aforementioned devices/displays.

According to a further aspect, there is provided a method of using a display protector with a heat source, the display protector comprising one or more transparent fluid incident regions and one or more fluid driver regions, the method comprising using the display protector to guide a fluid incident upon one or more of the transparent fluid incident regions away to one or more of the fluid driver regions to facilitate driving of the fluid from the one or more fluid driver regions by heat supplied by the heat source.

According to a further aspect, there is provided a method of making a display protector for use with a heat source, the display protector comprising one or more transparent fluid incident regions and one or more fluid driver regions, the method comprising configuring the display protector to enable it to guide a fluid incident upon one or more of the transparent fluid incident regions away to one or more of the fluid driver regions to facilitate driving of the fluid from the one or more fluid driver regions by heat supplied by the heat source.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

FIG. 1a shows an electronic display comprising a display protector (cross-section);

FIG. 1b shows a display protector comprising a fluid incident region and a fluid driver region (plan view);

DESCRIPTION OF SPECIFIC ASPECTS/EMBODIMENTS

Figure 2A:
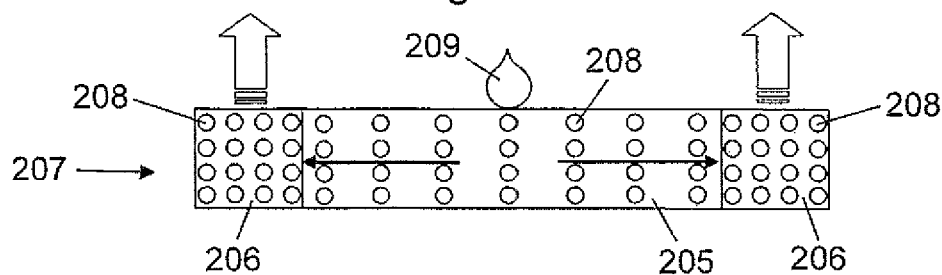
FIG. 2a shows a display protector comprising a first distribution of particles for guiding fluid from the fluid incident regions to the fluid driver regions (cross-section)

OLED displays are becoming increasingly popular in electronic devices as an alternative to incumbent liquid crystal (LCD) displays. In addition to providing full-colour video capability, OLED displays offer potential benefits in power usage and mechanical flexibility that cannot easily be achieved with an LCD display. The advent of truly flexible displays that are high resolution, full colour and video-rate capable will enable lighter, more robust displays, and will potentially allow for new device form factors and methods of interaction. One or more embodiments disclosed herein may be applicable to OLED displays as well as other types of displays, including LCD displays.

Display protectors have been developed to shield electronic displays from fluid (e.g. water vapour and/or oxygen) in the surrounding environment which can damage the display. FIG. 1a (cross-section) shows an electronic display 101 incorporating a display protector 104 in cross-section. In this example, the electronic display 101 comprises an image-generating layer 102 (e.g. comprising a plurality of OLEDs) and a touch-sensitive layer 103 (e.g. comprising a plurality of capacitive touch sensors), and the display protector 104 forms an outer layer of the display 101.

Existing display protectors 104 hinder the permeation of fluid therethrough in a number of different ways. Some of these display protectors 104 comprise materials configured to create a "tortuous path" that slows the ingress of fluid whilst others utilise "getter" materials configured to absorb, adsorb and/or react with the fluid. The term "getter" may include hygroscopic and desiccant materials. As mentioned in the background section, however, existing display protectors 104 may be insufficient for use with OLED displays. The display protector 104 and methods disclosed herein may or may not address this issue.

As shown in FIG. 1b (plan view), the present display protector 104 comprises one or more transparent fluid incident regions 105 and one or more fluid driver regions 106 (which may or may not be transparent). The display protector 104 is configured to guide a fluid incident upon one or more of the transparent fluid incident regions 105 away to one or more of the fluid driver regions 106 to facilitate driving of the fluid from the one or more fluid driver regions 106 by heat supplied by a heat source. The present display protector 104 therefore allows heat generated by the underlying device/display (e.g. via its own power dissipation) to be used to remove fluid incident upon the display protector 104 and regenerate any getter materials used within the display protector 104.

In the example shown in FIG. 1b, a single fluid driver region 106 is located at the periphery of the display protector 104 with a single fluid incident region 105 occupying the remaining area of the display protector 104. This configuration ensures that a transparent region of the display protector 104 (i.e. the fluid incident region 105) is centred on the electronic display and therefore allows non-transparent materials to be used to form the fluid driver regions 106 and/or underlying heat sources without hindering viewing of the display.

It should be noted here that although the figures referenced herein show the fluid incident 105 and fluid driver 106 regions formed from the same layer of the display protector 104, they could be formed from different layers. For example, if the display protector 104 comprises two layers of material, the fluid incident regions 105 may be formed from the upper layer of material and the fluid driver regions 106 may be formed from the lower layer of material. In this scenario, the fluid incident upon the upper layer of material would be guided to the lower layer of material to be driven from the fluid driver regions 106 by the heat source.

The display protector 104 may also comprise a substrate used to support the layers from which the fluid incident 105 and fluid driver 106 regions are formed. The substrate must be sufficiently transparent to enable light transmission therethrough, and should also be substantially mechanically resilient to allow bending and/or stretching of the display protector 104. The latter property is an important consideration if the underlying display is flexible and/or stretchable, as is the case with some OLED displays. The substrate would typically have a thickness of at least 25 μm to allow for lamination onto the underlying electronic display. Rather than including a substrate layer in the display protector 104, however, the underlying electronic display may be used as the supporting substrate instead.

Suitable substrate materials include polyethylene 2,6-naphthalate (PEN); polyethylene terephthalate (PET); polyimide (PI); polycarbonate (PC); polyethylene (PE); polyurethane (PU); polymethylmethacrylate (PMMA); polystyrene (PS); natural rubbers such as polyisoprenes, polybutadienes, polychloraprenes, polyisobutylenes, nitrile butadienes and styrene butadienes; saturated elastomeric materials such as polydimethylsiloxane (PDMS), silicone rubbers, fluorosilicone rubbers, fluoroelastomers, perfluoroelastomers and ethylene vinyl acetate (EVA); thermoplastic elastomers such as styrene block copolymers, thermoplastic polyolefins, thermoplastic vulcanisates, thermoplastic polyurethane (TPU), thermoplastic copolyesters and melt processable rubbers.

In some embodiments, the display protector comprises one or more layers 207 with a plurality of particles 208 embedded therein. In these embodiments, examples of which are illustrated in FIGS. 2a-2d (cross-section), the relative distribution of the particles 208 within the respective fluid incident regions 205 and fluid driver regions 206 of the one or more layers 207 is configured to guide the fluid 209 incident upon the fluid incident regions 205 away to the fluid driver regions 206.

In FIG. 2a, the relative distribution of the particles 208 within the respective fluid incident regions 205 and fluid driver regions 206 is such that the concentration of the particles 208 (i.e. the number of particles in a given area or volume) within the fluid driver regions 206 is greater than the concentration of the particles 208 within the fluid incident regions 205. This configuration uses capillary action to guide the fluid 209 from the fluid incident regions 205 to the fluid driver regions 206. Essentially, the differing particle concentrations results in a difference in the diameter of the pores available to the fluid 209 within the material 207 and creates a pressure gradient whenever there is a liquid meniscus which causes the fluid 209 to flow from the fluid incident regions 205 to the fluid driver regions 206. Furthermore, the driving of the fluid 209 from the one or more fluid driver regions 206 by heat supplied from the heat source serves to increase the pressure difference between the fluid incident regions 205 and the fluid driver regions 206 and therefore helps to encourage the flow of fluid 209.

Figure 2B:
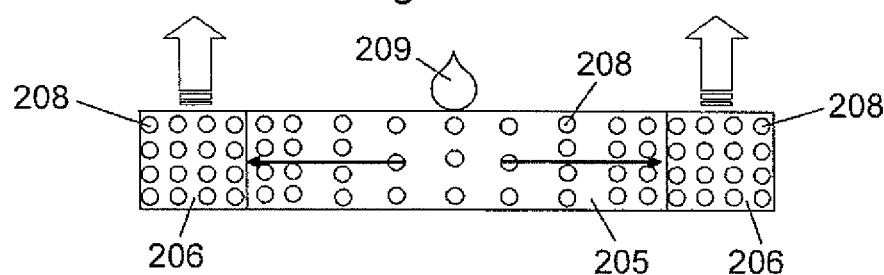
FIG. 2b shows a display protector comprising a second distribution of particles configured to guide fluid from the fluid incident regions to the fluid driver regions (cross-section)

FIG. 2b shows a variation of this approach in which the concentration of the particles 208 within the fluid incident regions 205 decreases with increasing distance from the fluid driver regions 206. This particle distribution may help to initiate the flow of fluid 209 towards the fluid driver regions 206.

Figure 2C:
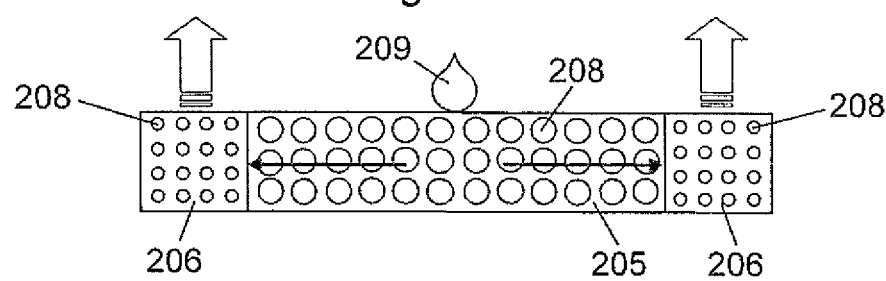
FIG. 2c shows a display protector comprising a third distribution of particles configured to guide fluid from the fluid incident regions to the fluid driver regions (cross-section)

In FIG. 2c, the relative distribution of the particles 208 within the respective fluid incident regions 205 and fluid driver regions 206 is such that the average size of the particles 208 within the fluid driver regions 206 is smaller than the average size of the particles 208 within the fluid incident regions 205. Given that the volume between adjacent particles 208 increases with increasing particle size (e.g. consider the pores between the atoms of a close-packed solid), the cohesive force of a fluid 209 in the volume between smaller particles 208 is greater than the cohesive force of a fluid 209 in the volume between larger particles 208. As a result, the differing particle size creates a pressure gradient between the fluid incident regions 205 and the fluid driver regions 206 and causes the fluid 209 to flow from the fluid incident regions 205 to the fluid driver regions 206.

Figure 2D:
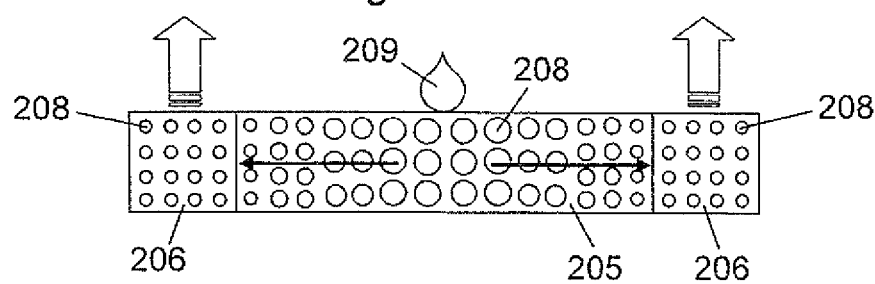
FIG. 2d shows a display protector comprising a fourth distribution of particles configured to guide fluid from the fluid incident regions to the fluid driver regions (cross-section)

In FIG. 2d, the size of the particles 208 within the fluid incident regions 205 increases with increasing distance from the fluid driver regions 206. As with the particle distribution of FIG. 2b, this configuration may help to initiate the flow of fluid 209 towards the fluid driver regions 206.

In embodiments where the display protector uses a relative particle distribution to guide the fluid 209 between the fluid incident regions 205 and the fluid driver regions 206, the particles 208 may have a diameter of no more than 1 µm, and preferably no more than 100 nm. This upper size limit serves to reduce optical Rayleigh scattering from the display protector and therefore helps to maintain the transparency of the material 207.

To further reduce the amount of fluid 209 permeating through the display protector to the electronic display, the particles 208 embedded within the one or more layers 207 of the display protector may comprise a getter material. These getter particles 208 may be used to "mop up" any residual fluid 209 within the fluid incident regions 205 which has not been successfully guided to the fluid driver regions 206 as well as any residual fluid 209 which has not been successfully driven from the fluid driver regions 206.

Suitable getter materials for use with water include inorganic materials such as phosphorous pentoxide, calcium chloride, calcium sulfate, calcium oxide, calcium hydride, activated alumina, aerogel, benzophenone, bentonite, montmorillonite, cobalt(II) chloride, copper(II) sulfate, lithium chloride, lithium bromide, lithium-aluminium hydride, magnesium, magnesium sulfate, magnesium perchlorate, magnesium oxide, potassium carbonate, potassium hydroxide, silica gel, sodium, sodium chlorate, sodium chloride, sodium hydroxide, sodium sulfate, sodium silicate, sucrose, sulphuric acid, alkali metal oxides, alkaline earth metal oxides, metal halides, metal perchlorates and metal sulphates. Suitable getter materials for use with oxygen include zeolites, calcium carbonate, iron (II) carbonate, iron (II) oxide, activated charcoal and ascorbic acid.

At least one of the layers of material 207 within which the particles 208 are embedded may comprise an adhesive (e.g. a liquid optically clear adhesive (LOCA)). This feature is particularly useful for attaching the display protector to the electronic display. Furthermore, since optically clear adhesives are commonly used to bond the various layers of an electronic display together, the display protector could be used for bonding purposes as well as for protecting the electronic display against fluid ingression. As well as being substantially optically transparent, the layer of adhesive may be substantially mechanically resilient.

LOCAs are typically acrylic, polyurethane, methylmethacrylate or silicone-based. In addition to UV and thermal curing, some silicone-based LOCAs are "moisture"-curable (combination of moisture and UV), whilst others can be cured chemically by addition of a chemical cross-linker which may or may not be catalyzed by a metal. Suitable examples include materials supplied by Henkel such as their 319XX series UV cured Acrylic and Silicone products, 3M's 21xx series of UV cured Acrylic adhesives, Delo's Photobond products and Dymax UV curable adhesives 9008.

Rather than using a relative particle distribution to guide the fluid 309 from the fluid incident regions 305 to the fluid driver regions 306, some embodiments of the display protector comprise one or more patterned fluid channels 310 configured to guide the fluid 309 incident upon the fluid incident regions 305 away to the fluid driver regions 306. The patterned fluid channels 310 may be formed in one or more layers of material using printing or lithographic techniques. These embodiments reply on a combination of capillary action and osmotic pressure to guide the fluid 309 along the fluid channels 310.

Figure 3A:
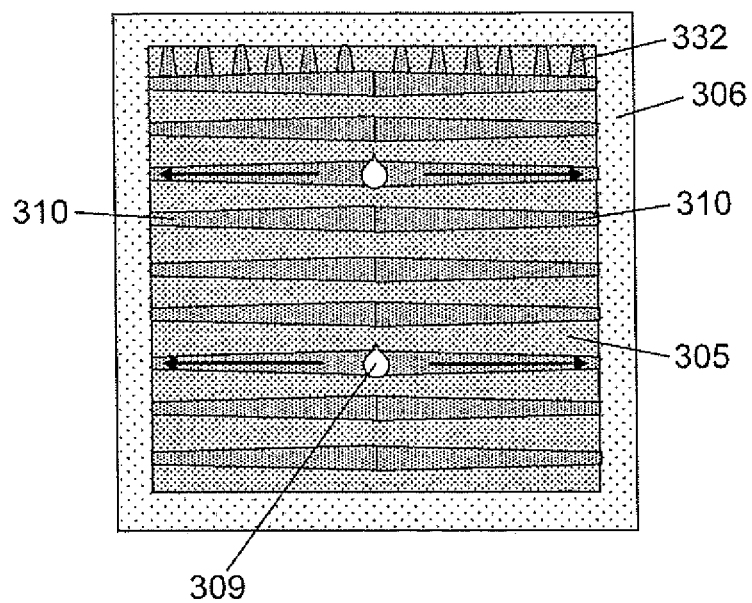
FIG. 3a shows a display protector comprising patterned fluid channels configured to guide fluid from the fluid incident regions to the fluid driver regions (plan view)

One example is shown in FIGS. 3a (plan view). In this example, the patterned fluid channels 310 lead from the fluid incident regions 305 to the fluid driver regions 306 with the width of the patterned fluid channels 310 decreasing towards the fluid driver regions 306. To enable fluid 309 to be collected from anywhere within the fluid incident regions 305, some of the fluid channels 332 within the fluid incident regions 305 may be configured to merge into one or more wider fluid channels 310 leading to the fluid driver regions 306. As before, the driving of the fluid 309 from the one or more fluid driver regions 305 by heat supplied from the heat source serves to increase the pressure difference between the fluid incident regions 305 and the fluid driver regions 306 and therefore helps to encourage the flow of fluid 309.

To further reduce the amount of fluid permeating through the display protector to the electronic display, the layer of material 311 in which the patterned fluid channels 310 are formed may comprise a getter material (e.g. one or more of the getter materials listed above).

Figure 3B:
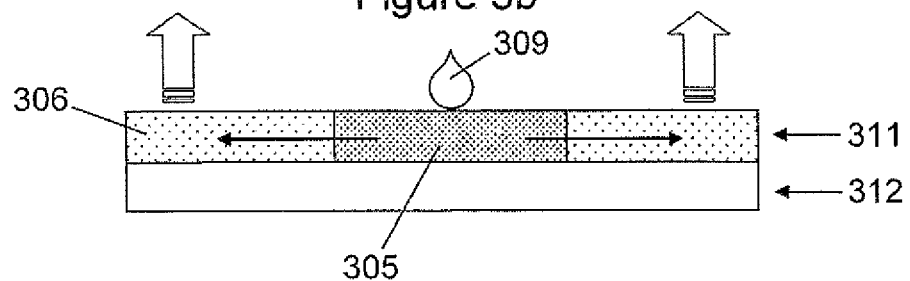
FIG. 3b shows a display protector comprising a layer of getter material and a layer of adhesive (cross-section)

The display protector may also comprise a layer of adhesive 312 configured for attaching the layer of getter material 311 to one or more layers of the electronic display (as shown in cross-section in FIG. 3b). One or both of the layer of getter material 311 and the layer of adhesive 312 may be substantially optically transparent (to facilitate viewing of the display) and/or substantially mechanically resilient (to facilitate bending and/or stretching of the display protector). The getter material 311 may be incorporated within the adhesive 312 to form a substantially optically transparent adhesive layer which can absorb/adsorb the fluid 309.

Figure 3C:
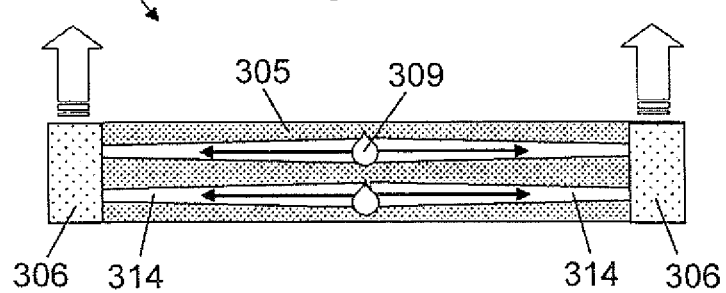
FIG. 3c shows a display protector comprising a porous substrate having a pore structure configured to guide fluid from the fluid incident regions to the fluid driver regions (cross-section)

Instead of patterning a layer of material to form one or more fluid channels 310, the pores 314 of a porous substrate 313 may be used to guide the fluid 309 from the fluid incident regions 305 to the fluid driver regions 306. The porous substrate 313 may be a natural or synthetic material. FIG. 3c (cross-section) shows one example in which the synthetic porous substrate 313 comprises a plurality of pores 314 leading from the fluid incident regions 305 to the fluid driver regions 306. In this example, the fluid driver regions 306 are located at the edges of the display protector. In addition, the pores 314 are specifically configured to decrease in diameter towards the fluid driver regions 306 to increase the pressure gradient. Ideally, the pores 314 would have a diameter of no more than 1 µm, and preferably no more than 100 nm, in order to reduce optical Rayleigh scattering from the display protector.

In embodiments of the display protector comprising a porous substrate 313, the pores 314 may comprise a getter material to absorb, adsorb and/or react with the fluid 309. The getter material may be used to fill the pores 314, or it could form a coating on the internal surfaces of the porous substrate 313. Furthermore, one or both of the porous substrate 313 and the getter material may be substantially optically transparent (to facilitate viewing of the display) and/or substantially mechanically resilient (to facilitate bending and/or stretching of the display protector).

The porous substrate 313 may be formed from a block copolymer 315. Block copolymers 315 comprise two or more chemically distinct polymers and have the ability to self-assemble into a variety of different phase morphologies such as spherical, vertically oriented pillar, horizontally-oriented pillar, gyroid, double gyroid, vertically-oriented lamellar and horizontally-oriented lamellar structures. Block copolymers 315 may comprise two or more homopolymer blocks. Block copolymers 315 with two or three distinct blocks are called diblock copolymers and triblock copolymers, respectively.

The resulting structure depends on the specific polymers that are used to form the block copolymer 315 and also the ratios of the respective polymers. For example, a ratio of 50:50 may result in a lamellar structure with the thickness of the lamellae 316 determined by the length of the polymer chains in each block. On the other hand, a ratio of 60:40 may result in dispersion of the minority phase in the form of cylinders within the majority phase to give a cylindrical phase. The formation of a horizontally-oriented lamellar structure in which the lamellae 316 are parallel to the plane of the display/display protector may be particularly useful in the present case for intercepting the ingress of fluid 309.

Figure 3D:
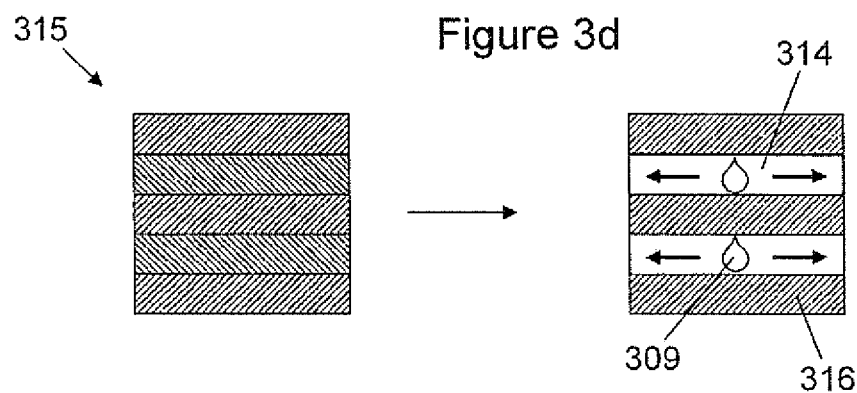
FIG. 3d shows a block copolymer suitable for use as the porous substrate (cross-section)

FIG. 3d (cross-section) shows the removal of one phase of a block copolymer 315 having a horizontally-oriented lamellar structure to form a plurality of pores 314. A layer of getter material (either as a continuous film or as a plurality of getter particles) may be deposited between the lamellae 316 to further inhibit the permeation of fluid 309 through the display protector. Additionally or alternatively, a polymer which exhibits fluid-getting properties could be used to form the porous substrate. For example, the polymer might be polyvinylpyridine, which is hygroscopic.

In practice, any suitable polymers may be used to form the porous substrate. For example, the block copolymer 315 may comprise any two or more chemically distinct polymers such as polystyrene, polylactide, polymethylmethacryclate (PMMA), polyimide, polyfluorostyrene, polybutadiene, polyisoprene, polydimethylsiloxane (PDMS) or polyvinylpyridine (PVP).

In some embodiments, the block copolymer 315 may comprise a polymer that exhibits adhesive properties. This removes the need for a separate adhesive layer for attaching the display protector to the underlying electronic display and may also be used to bond the various layers of the display together (as mentioned previously).

Another method of guiding the fluid 409 from the fluid incident regions 405 to the fluid driver regions 406 is to incorporate at least one fluidphobic or fluidphilic material into the display protector. The term "fluidphobic" may be taken to mean any material which is capable of repelling a fluid 409, and may encompass hydrophobic, lipophobic (oleophobic) and lyophobic materials. Likewise, the term "fluidphilic" may be taken to mean any material which is capable of attracting a fluid 409, and may encompass hydrophilic, lipophilic (oleophilic) and lyophilic materials.

Figure 4:
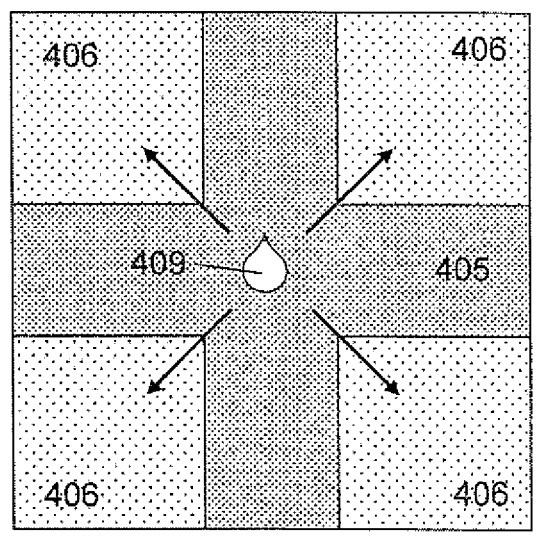
FIG. 4 shows a display protector comprising fluidphobic and fluidphilic materials configured to guide fluid from the fluid incident regions to the fluid driver regions (plan view)

This technique relies on the intermolecular forces between the incident fluid 409 and the fluidphobic or fluidphilic materials to guide the fluid 409 from the fluid incident regions 405 to the fluid driver regions 406. To achieve this functionality, the fluid incident regions 405 should comprise a fluidphobic material (i.e. to repel the fluid 409) and/or the fluid driver regions 406 should comprise a fluidphilic material (i.e. to attract the fluid 409). Although it may be sufficient to incorporate either a fluidphobic material or a fluidphilic material into the display protector, the use of both types of material provides attractive and repulsive forces simultaneously and may therefore be more effective for guiding the fluid 409. FIG. 4 shows an example of a display protector (in plan view) in which the fluid driver regions 406 are located at four corners of the display protector with a single fluid incident region 405 occupying the remaining area of the display protector. In this example, the fluid driver regions 406 comprise a fluidphilic material and the fluid incident region 405 comprises a fluidphobic material, thus guiding the incident fluid 409 towards the corners of the display protector.

Figure 9:
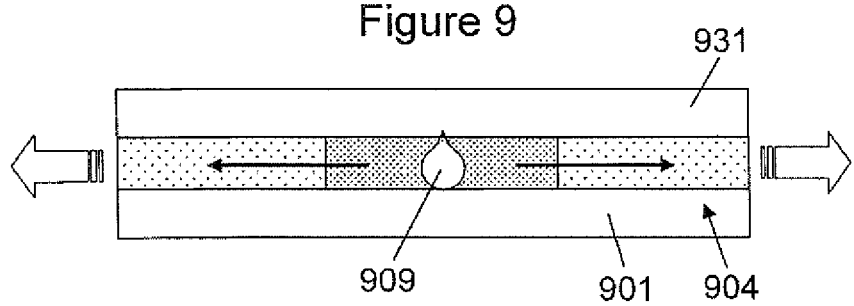
FIG. 9 shows a display protector configured to drive fluid laterally from the edges of the display protector (cross-section).

When the display protector 904 is attached to the electronic display 901 of a device, the device may comprise one or more outer layers 931 to help prevent damage to the display 901/display protector 904. These layers 931 may comprise a material (e.g. glass) which is impermeable to fluid 909 and therefore prevents the fluid 909 from being driven vertically from the display protector 904. To address this issue, the display protector 904 may be configured (using any of the aforementioned techniques) to guide the fluid 909 to the edges of the stack so that the fluid 909 can be driven laterally from the display protector 904 as shown in cross-section in FIG. 9.

As mentioned previously, the fluid 509 which is guided to the fluid driver regions 506 is driven from the display protector by heat supplied by a heat source 517 (which may comprise a plurality of heat sources 517). In practice, the heat source 517 would typically be located in proximity to the display protector to increase the temperature of the fluid driver regions 506 directly. Nevertheless, heat from a more remotely located heat source 517 could be transferred to the fluid driver regions 506 by conduction, convention or radiation (although this may require modification of the display protector and/or underlying display/device). Another option would be to incorporate a dedicated heat source 517 into the display protector itself rather than using an existing heat source 517 in the display/device.

The heat source 517 may be used to apply heat at the edges of the display protector to drive the fluid 509 from the fluid driver regions 506 into the surrounding environment. This is useful when the electronic display or display protector comprises one or more outer layers which prevent evaporation/transpiration of fluid 509 perpendicular to the plane of the display/display protector (as discussed above). Evaporation/transpiration of fluid 509 at the edges allows cohesion-tension to wick fluid 509 from within several millimeters of the edges. The dry edge region that this produces then encourages diffusion of fluid 509 from more distant regions of the display protector.

Figure 5A:
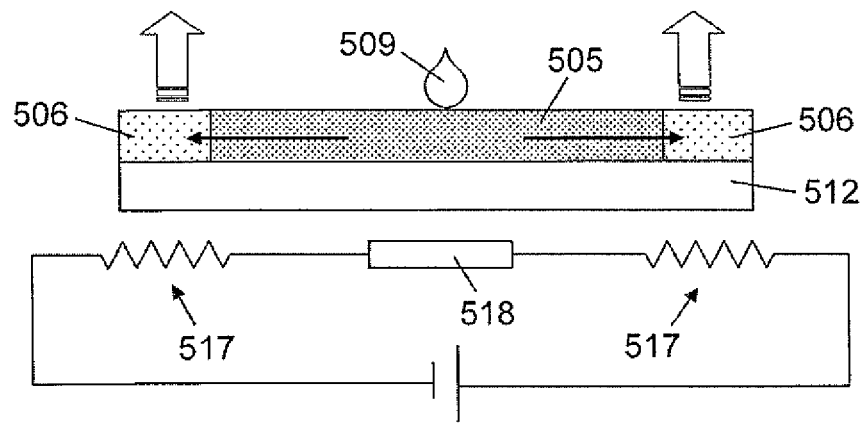
FIG. 5a shows a fluid-sensitive resistor electrically connected to a resistive heating element to enable self-regulation of the heating current (cross-section)

As illustrated in FIG. 5a (cross-section), the heat source may comprise a resistive heating element 517 within the display, device or display protector. In this scenario, the display, device or display protector may also comprise a fluid-sensitive resistor 518 serially connected to the resistive heating element 517 and configured such that its electrical resistance decreases as the amount of fluid 509 increases. For example, the fluid-sensitive resistor 518 may comprise a humidity sensor. Graphene oxide-based humidity sensors have the advantage of being optically transparent and would therefore be suitable for use within the display or display protector without hindering viewing of the display. The use of a fluid-sensitive resistor 518 allows self-regulation of the electrical current used to heat the resistive heating element 517 (i.e. the "heating current") such that the amount of current is consistent with the amount of fluid 509 present on the fluid incident regions 505 of the display protector. This feature may therefore help to reduce power consumption when a dedicated heat source 517 is used. It should be noted, however, that the fluid-sensitive sensor (and heat source) need not be resistive. In fact, any fluid-sensitive sensor capable of providing feedback control to the heat source could be used.

Figure 5B:
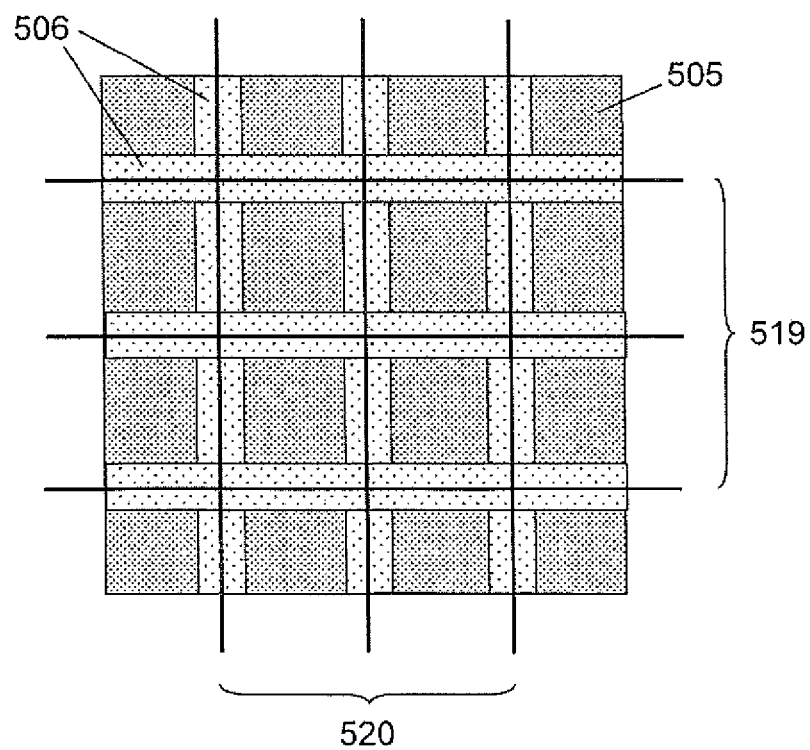
FIG. 5b shows a display protector in which the locations of the fluid driver regions correspond with the locations of the drive and sense lines of a touch-sensitive display (plan view)

Another example of a suitable heat source is shown in FIG. 5b (plan view). In this example, the underlying display is a touch-sensitive display comprising drive 519 and sense 520 lines. When an electrical current is passed through the drive 519 and sense 520 lines, the resistance of the conductive material causes resistive heating which can be used to increase the temperature locally. If the display protector is positioned in proximity to the touch-sensitive layer, then the fluid driver regions 506 will have a pattern which corresponds to the locations of the drive 519 and sense 520 lines.

Figure 6:
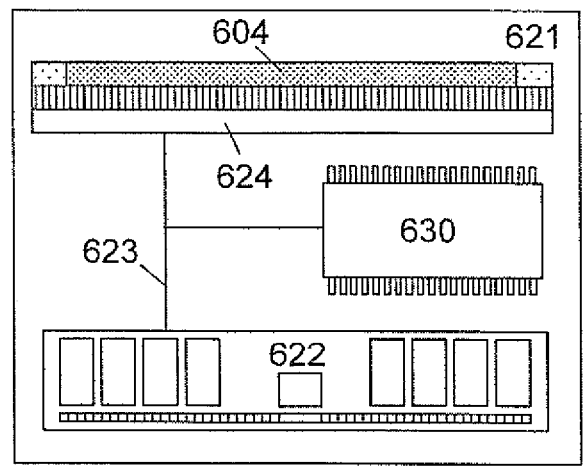
FIG. 6 shows an apparatus comprising the display protector described herein.

FIG. 6 shows one example of an apparatus 621 comprising the display protector 604 described herein. The apparatus 621 may be one or more of an electronic device, a portable electronic device, a telecommunications device, a portable telecommunications device, an electronic display, a touch-sensitive display, and a module for any of the aforementioned devices/displays.

The electronic display may be an organic light emitting diode (OLED) display, a liquid crystal display (LCD), a polymer dispersed liquid crystal (PDLC) or other reflective LCD display, an electrophoretic (EP) display, an electroluminescent (EL) display, an electrowetting (EW) display, an electrochromic (EC) display, or a display utilising other optical modulation effects such as Interference based on frustrated internal reflection or Fabry Perot cavities.

The touch-sensitive display may include a touch-sensitive layer based upon resistive, optical or capacitive touch sensing. This touch-sensitive layer may or may not be included as part of the display in the form of in-cell or on-cell touch capability or using optical sensing pixels. Separate touch-sensitive layers based upon resistive or capacitive touch may include conductive patterns created from transparent conducting metal oxides such as indium tin oxide (ITO), fluorine doped tin oxide (FTO), aluminium doped zinc oxide (AlZnO), poly(2,3-dihydrothieno-1,4-dioxin)-poly(styrenesulfonate)(PEDOT:PSS), polypyrrole (Ppy), silver nanowires, carbon nanotubes, graphene or graphene-based materials including composites thereof.

In the example shown, the apparatus 621 is an electronic device comprising a touch-sensitive display 624 with the display protector 604 attached thereto, a processor 630, and a storage medium 622, which are electrically connected to one another by a data bus 623. In this example, the apparatus comprises a heat source in the form of the drive and sense lines of the touch-sensitive display, but it could incorporate additional and/or alternative heat sources. For example, the heat sources may comprise any electronic components of the electronic device that generate heat as a result of their general operation, such as the CPU, wireless transmitter/receiver, Bluetooth™ and NFC communication chips, or the drive electronics and/or light-emitting components of the display.

As described previously, the display protector 604 comprises one or more transparent fluid incident regions and one or more fluid driver regions, and is configured to guide a fluid incident upon one or more of the transparent fluid incident regions away to one or more of the fluid driver regions to facilitate driving of the fluid from the one or more fluid driver regions by heat supplied by the heat source.

The processor 630 is configured for general operation of the apparatus 621 by providing signalling to, and receiving signalling from, the other components (e.g. the electronic display 624 and heat source) to manage their operation. The processor 630 may be a microprocessor, including an Application Specific Integrated Circuit (ASIC).

The storage medium 622 is configured to store computer code configured to perform, control or enable operation of the apparatus 621. The storage medium 622 may also be configured to store settings for the other components. The processor 630 may access the storage medium 622 to retrieve the component settings in order to manage the operation of the other components. The storage medium 622 may be a temporary storage medium such as a volatile random access memory. On the other hand, the storage medium 622 may be a permanent storage medium such as a hard disk drive, a flash memory, or a non-volatile random access memory.

Figure 7A:
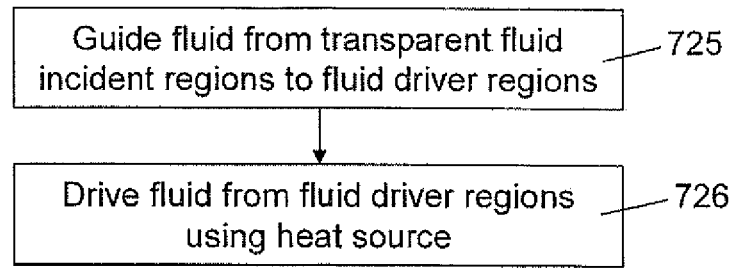
FIG. 7a shows the main steps of a method of using the display protector described herein.
Figure 7B:
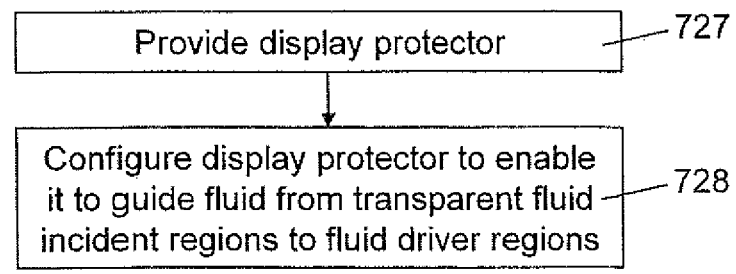
FIG. 7b shows the main steps of a method of making the display protector described herein.

The main steps 725-726 of a method of using the display protector described herein are illustrated schematically in FIG. 7a. Similarly, the main steps 727-728 of a method of making the display protector described herein are illustrated in FIG. 7b. A number of different fabrication techniques may be used to form the display protector depending on the approach used to guide the fluid from the fluid incident regions to the fluid driver regions.

In embodiments that use a particle distribution to guide the fluid, the display protector may be formed by mixing the into an adhesive to form a composite material and depositing the composite material onto a supporting substrate. To achieve a specific particle distribution, multiple batches of the composite material could be prepared with different sizes and concentrations of embedded particles. The various composites could then be deposited onto different regions of the substrate (e.g. by flame spraying, aerosol spraying, dip coating, syringe deposition, inkjet deposition, slot coating, bar coating, flexographic printing, screen printing, gravure printing or pad printing) and then cured. Depending on the type of adhesive, UV, thermal or chemical curing may be used.

Another way of achieving the desired particle distribution is to disperse magnetic or dielectric particles within an adhesive and use a magnetic (for magnetic particles) or electric (for dielectric particles) field to manipulate their positions before curing. The curing process could then be used to fix the particles in place within the adhesive once the correct distribution is achieved. To enable movement of the particles within the adhesive, however, it may be necessary to coat the surfaces of the particles with a suitable surfactant before dispersion.

A further method of achieving the desired particle distribution is to deposit the appropriate number and size of particles directly onto the different regions of the substrate and then deposit a layer of adhesive on top. The adhesive would then coat the particles and fill the spaces therebetween to create a composite material. The composite material could then be cured to fix the particles in place. For instance, a technique such as flame spraying can be used to create getter particles with a controlled range of particle size (in particular, very small particles of less than 100 nm in diameter) that can be deposited in the desired concentration at different locations within the display protector.

In embodiments that use patterned channels to control the flow of fluid, e-beam of photolithography could be used in combination with lift-off or wet/dry chemical etching to form the channels. Alternatively, 3D printing techniques could be used to form the channels. Similar techniques could also be used to deposit a pattern of fluidphilic and fluidphobic materials onto a substrate, although step-wise deposition of these materials onto the substrate through predefined masks would probably be simpler. Printing methods (e.g. inkjet, flexographic, gravure or screen printing) can be used to deposit the pattern of fluidphilic and fluidphobic materials onto the substrate.

In embodiments where the display protector comprises a porous substrate having a pore structure configured to guide the fluid, a block copolymer may be used. One method of making the porous substrate from a polystyrene-polylactic acid (PS-PLA) block copolymer will now be described. The block copolymer is first dissolved in toluene to form a solution with a concentration of about 11% w/w and is then deposited onto a supporting substrate using any suitable technique which enables a uniform layer to be created (e.g. spin coating or blade coating). The thickness of the layer of the block copolymer solution may be between 0.5 to 20 µm. The solution is then annealed in a vacuum and inert atmosphere at a temperature of 173° C. for about 20 minutes. After the block copolymer solution has been annealed, it is cooled to room temperature. The PLA phase is then chemically removed by soaking the apparatus in 0.1M NaOH in a 50:50 water/methanol solution for about three hours. Removal of the PLA phase results in a porous structure.

Figure 8:
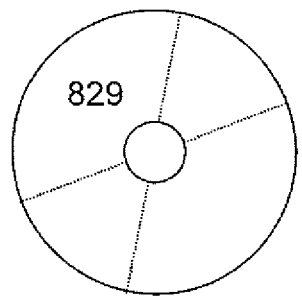
FIG. 8 shows a computer-readable medium comprising a computer program configured to perform, control or enable the method of FIG. 7b.

FIG. 8 illustrates schematically a computer/processor readable medium 829 providing a computer program according to one embodiment. In this example, the computer/processor readable medium 829 is a disc such as a digital versatile disc (DVD) or a compact disc (CD). In other embodiments, the computer/processor readable medium 829 may be any medium that has been programmed in such a way as to carry out an inventive function. The computer/processor readable medium 829 may be a removable memory device such as a memory stick or memory card (SD, mini SD, micro SD or nano SD).

The computer program may comprise computer code configured to perform, control or enable the making of the display protector. In particular, the computer program may be used to configure the display protector to enable it to guide a fluid incident upon one or more of the transparent fluid incident regions away to one or more of the fluid driver regions to facilitate driving of the fluid from the one or more fluid driver regions by heat supplied by the heat source.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means plus function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A display protector for use with a heat source, the display protector comprising one or more transparent fluid incident regions and one or more fluid driver regions, wherein the display protector is configured to guide a fluid incident upon one or more of the transparent fluid incident regions away to one or more of the fluid driver regions to facilitate driving of the fluid from the one or more fluid driver regions by heat supplied by the heat source;

wherein the display protector comprises one or more layers with a plurality of particles embedded therein, and wherein the relative distribution of the particles within the respective fluid incident regions and fluid driver regions of the one or more layers is configured to guide the fluid incident upon the fluid incident regions away to the fluid driver regions; and wherein the relative distribution is such that the concentration of the particles within the fluid driver regions is greater than the concentration of the particles within the fluid incident regions.

2. The display protector of claim 1, wherein the relative distribution is such that the average size of the particles within the fluid driver regions is smaller than the average size of the particles within the fluid incident regions.

3. The display protector of claim 1, wherein the particles comprise a getter material.

4. The display protector of claim 1, wherein the display protector comprises one or more patterned fluid channels configured to guide the fluid incident upon the fluid incident regions away to the fluid driver regions.

5. The display protector of claim 4, wherein the patterned fluid channels lead from the fluid incident regions to the fluid driver regions, and wherein the width of the patterned fluid channels decreases towards the fluid driver regions.

6. The display protector of claim 1, wherein the display protector comprises at least one fluidphobic or fluidphilic material to guide the fluid incident upon the fluid incident regions away to the fluid driver region.

7. The display protector of claim 6, wherein the fluid incident regions comprise a fluidphobic material and/or the fluid driver regions comprise a fluidphilic material.

8. The display protector of claim 1, wherein the display protector comprises a porous substrate having a pore structure configured to guide the fluid incident upon the fluid incident regions away to the fluid driver regions.

9. The display protector of claim 8, wherein the pore structure comprises one or more pores leading from the fluid incident regions to the fluid driver regions, and wherein the diameter of the pores decreases towards the fluid driver regions.

10. The display protector of claim 8, wherein the porous substrate comprises a block copolymer having a horizontally-oriented lamellar structure.

11. The display protector of claim 1, wherein the fluid driver regions are located at the periphery of the display protector.

12. An apparatus comprising the display protector of claim 1 and the heat source.

13. The apparatus of claim 12, wherein the apparatus comprises a fluid-sensitive sensor configured to control the amount of heat supplied by the heat source based on the amount of incident fluid.

14. The apparatus of claim 13, wherein the heat source comprises a resistive heating element and the fluid-sensitive sensor comprises a fluid-sensitive resistor serially connected to the resistive heating element, and wherein the fluid-sensitive resistor is configured such that its electrical resistance decreases as the amount of fluid increases.

15. The apparatus of claim 12, wherein the apparatus comprises a touch sensitive display, and wherein the heat source comprises a drive or sense line of the touch sensitive display.

16. The apparatus of claim 12, wherein the apparatus is one or more of an electronic device, a portable electronic device, a telecommunications device, a portable telecommunications device, an electronic display, a touch-sensitive display, an OLED display, and a module for any of the aforementioned devices/displays.

17. A method of using a display protector with a heat source, the display protector comprising one or more transparent fluid incident regions and one or more fluid driver regions, the method comprising using the display protector to guide a fluid incident upon one or more of the transparent fluid incident regions away to one or more of the fluid driver regions to facilitate driving of the fluid from the one or more fluid driver regions by heat supplied by the heat source;

wherein the display protector comprises one or more layers with a plurality of particles embedded therein, and wherein the relative distribution of the particles within the respective fluid incident regions and fluid driver regions of the one or more layers is configured to guide the fluid incident upon the fluid incident regions away to the fluid driver regions; and wherein the relative distribution is such that the concentration of the particles within the fluid driver regions is greater than the concentration of the particles within the fluid incident regions.

18. A method of making a display protector for use with a heat source, the display protector comprising one or more transparent fluid incident regions and one or more fluid driver regions, the method comprising configuring the display protector to enable it to guide a fluid incident upon one or more of the transparent fluid incident regions away to one or more of the fluid driver regions to facilitate driving of the fluid from the one or more fluid driver regions by heat supplied by the heat source;

wherein the display protector comprises one or more layers with a plurality of particles embedded therein, and wherein the relative distribution of the particles within the respective fluid incident regions and fluid driver regions of the one or more layers is configured to guide the fluid incident upon the fluid incident regions away to the fluid driver regions; and wherein the relative distribution is such that the concentration of the particles within the fluid driver regions is greater than the concentration of the particles within the fluid incident regions.

* * * * *